United States Patent [19]

Baker et al.

[11] 4,220,988
[45] Sep. 2, 1980

[54] CONTROLLER FOR WAVEFORM SYNTHESIZER

[75] Inventors: Richard H. Baker, Bedford, Mass.; Kevin E. White, Washington Township, Warren County, N.J.

[73] Assignee: Exxon Research & Engineering Co., Florham Park, N.J.

[21] Appl. No.: 890,462

[22] Filed: Mar. 27, 1978

[51] Int. Cl.² .................................. H02M 1/12
[52] U.S. Cl. ............................................. 363/43
[58] Field of Search ................................ 363/39–43

[56] References Cited

U.S. PATENT DOCUMENTS

| 3,510,751 | 5/1970 | Resch | 363/42 |
| 3,958,171 | 5/1976 | Sekino | 363/41 |

Primary Examiner—William M. Shoop
Attorney, Agent, or Firm—Kenneth Watov

[57] ABSTRACT

A method and apparatus for producing a plurality of pulse width modulated control signals, the combination of which are pulsed representations of the pattern of a reference waveform, comprises a sine wave generating network for producing the reference sine wave, a triangular waveform generating network for producing a triangular wave, a plurality of level shifting circuits for level shifting the triangular wave to produce a plurality of triangular waves each at a different level and having a different range of amplitudes, and a plurality of comparators each for comparing an individual one of the plurality of level shifted triangular waves with each half-cycle of the reference sine wave, for producing the plurality of control signals. The control signals may be decoded by decoding networks, the decoded control signals being applied for operating a waveform synthesizer or inverter stage to produce a multitiered steplike notched waveform equivalent of the reference waveform.

22 Claims, 12 Drawing Figures

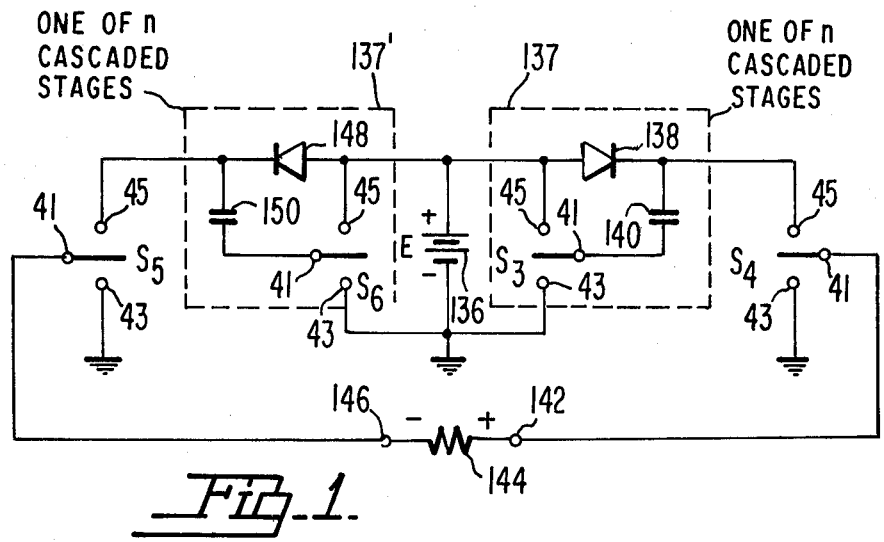
_Fig. 1._
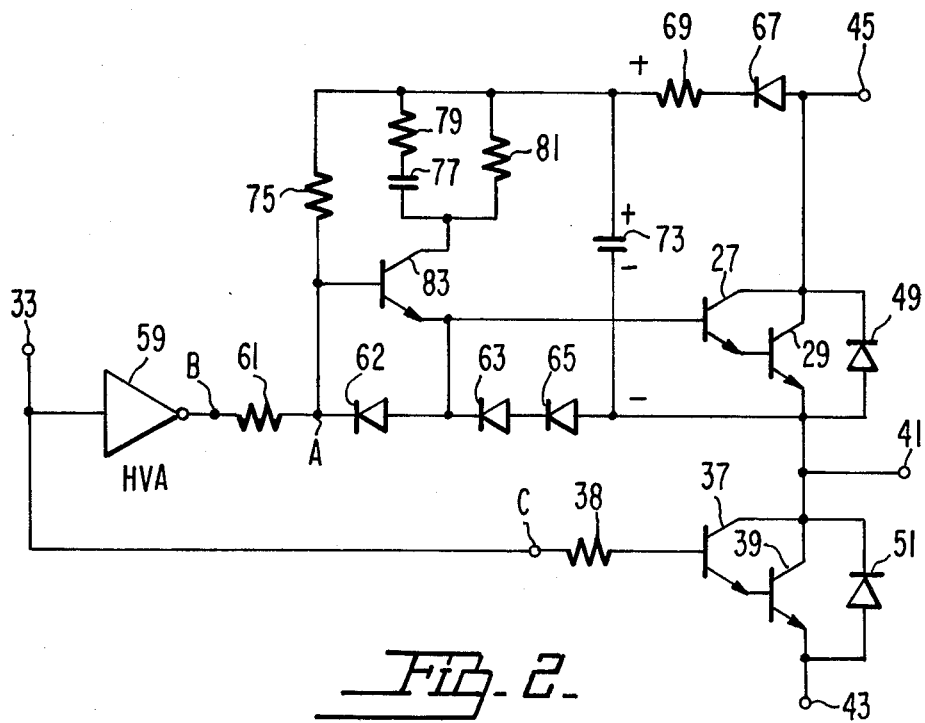
_Fig. 2._

CONTROLLER FOR WAVEFORM SYNTHESIZER

The field of the present invention relates generally to waveform synthesizer and inverter systems, and more particularly to a method and control system for operating such inverter and waveform synthesis systems.

Many applications require that a DC voltage be converted into an AC voltage having a particular waveform, most often a sinusoidal waveform. Many different inverter and waveform synthesis systems are available for providing this function. These systems may be used to drive many different types of AC loads, and are often adapted for driving AC motors over a range of different combinations of speed and torque. To perform this function, the synthesized AC voltage waveform, which is sinusoidal in this example, must be independently variable in frequency and amplitude, well regulated over a wide range of power levels, and adaptable to operate with either single or multiphase AC loads. It is also important that the synthesized waveform be relatively free of harmonic components, in this case approaching a pure sinusoidal waveform. As is known in the art, such waveforms can be synthesized using pulse width modulation (PWM) techniques for producing a synthesized multitier step-like waveform equivalent of a desired waveform. Each half-cycle of the synthesized waveform is chopped into a series of discrete pulses, producing a notched waveform. The time occurrence and pulse widths of the individual pulses of the synthesized waveform are controlled for reducing the harmonic content of the synthesized waveform. Also, many of the known control circuits for operating such waveform synthesizer and inverter systems derive control signals by the comparison of a sine wave reference signal or waveform with a single triangular common waveform, the latter having a frequency which is substantially higher than the former. The pulse train of control signals or pulses derived from such comparison have pulse widths corresponding to the period of time between successive intercepts of the reference signal and timing signal when the timing signal is greater in amplitude than the reference signal. Such a control system can be found in Resch patent U.S. Pat. No. 3,510,751, issued on May 5, 1970, for producing a single level bipolar PWM synthesized sine wave. Also, in Plunkett U.S. Pat. No. 4,047,083, issued on Sept. 6, 1977, a motor drive system including an inverter for producing a single-tier bipolar PWM synthesized sine wave teaches control signal generating means utilizing the comparison of a sine wave reference signal with a single triangular timing waveform.

The present inventors recognized that generally the purity of the synthesized waveform is enhanced when the notched PWM synthesized waveform is multitiered, and that the control system for producing the control signals for driving a waveform synthesizer for producing such a multitiered waveform is simplified if a plurality of triangular timing waveforms are level shifted from one another and used for sampling segments of each half-cycle of the reference signal via comparator means. Accordingly, the present invention includes the steps of generating a reference waveform, generating a plurality of level shifted timing waveforms each having a different range of amplitudes and each having a frequency substantially greater than that of the reference waveform, comparing the timing waveforms with each half-cycle of the reference waveform for producing a plurality of PWM pulse trains, and decoding each one of the plurality of pulse trains for providing control signals for operating the switching circuits of a particular waveform synthesizer or inverter system, for producing a multitiered step-like notched waveform equivalent of said reference waveform.

In the drawing wherein like elements have the same reference designation:

FIG. 1 is a circuit schematic diagram of one example of a waveform synthesizer circuit;

FIG. 2 is a circuit schematic diagram of a solid-state switching circuit for providing each one of the switches $S_3$–$S_6$ of FIG. 1;

Figure 5:
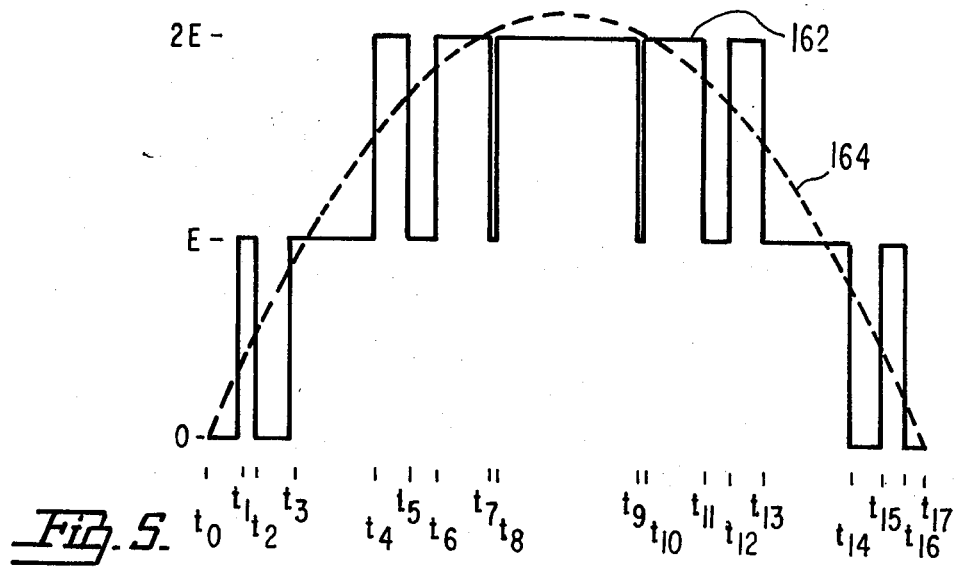
FIG. 5 shows the multitiered step-like notched waveform equivalent of the sine wave reference signal, as produced by a waveform synthesizer circuit driven by the control signals of FIG. 4.

The waveform synthesizer circuit of FIG. 1 basically operates as follows. For a polarity of output signal across a load 144 as shown in FIG. 1, the pole 41 of switch $S_4$ is connected to upper contact 45 of its switch, and the pole 41 of switch $S_5$ is connected to its respective lower contact 43. With switches $S_4$ and $S_5$ operated as described, the capacitor 140 and the load 144 have plus E applied across them whenever the switch $S_3$ has its pole 41 connected to its lower contact 43. With capacitor 140 assumed charged to plus E volts as previously described, its switch $S_3$ is now operated to connect its pole 41 to its upper contact 45, the capacitor 140 will be connected in series with the battery 136 across the load 144, for applying plus 2 E volts across this load 144. With switch $S_5$ positioned as previously described, if switch $S_4$ is now operated to place its pole 41 at its lower contact 43, the load 144 will be effectively grounded at each end and have a voltage drop thereacross of zero volt. The polarity of the voltage applied across the load 144 is reversed by operating the switch S4 for placing its pole 41 at its lower contact 43, and switch S5 for placing its pole 41 at its upper contact 45. If switch S6 is now operated to place its pole 41 at its lower contact 43, capacitor 150 will have E volts applied across it, and the load 144 will have $-E$ volts applied across it with respect to input terminal 142. If the switch S6 is now operated to place its pole 41 at its upper contact 45, and capacitor 150 is fully charged to E volts, $-2E$ volts will be applied across load 144 with respect to input terminal 142. As would be clear to one skilled in the art, up to n stages of level shifting 137 can be cascaded, along with n cascaded stages of level shifting 137', and the waveform synthesizer circuit operated for selectively providing in steps of $\pm E$ volts up to $\pm nE$ volts across the load 144. A detailed explanation of the operation of the waveform synthesizer circuit of FIG. 1 is found in the copending application U.S. Ser. No. 846,697 of Richard H. Baker, filed Oct. 31, 1977, for WAVEFORM SYNTHESIZER. Reference is made to FIG. 5 of this copending application, which figure is identical to the circuit shown in FIG. 1 of the present application, even as to reference designations.

Figure 6:
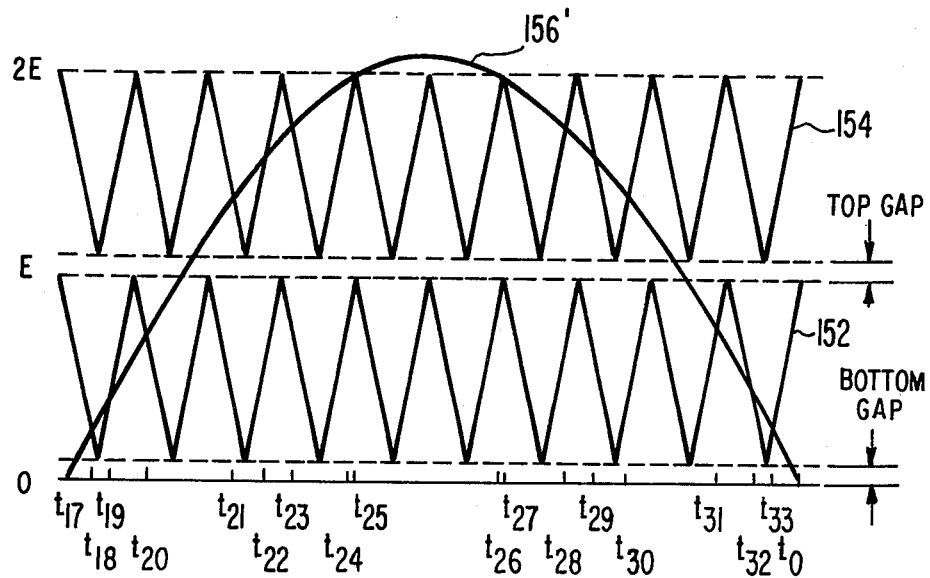
FIG. 6 shows the intercepts between the inverted negative half-cycle of the sine wave reference signal and the pair of level shifted triangular timing waveforms.

In FIG. 2, a high-power switching amplifier circuit is shown, suitable for serving as each one of the switches S3 through S6 of the waveform synthesizer circuit of FIG. 1. Of course, the swithces S3 through S6 can each be mechanical, electromechanical, or solid state, if desired. A detailed explanation of the operation of the switching amplifier circuit of FIG. 2 is found in the copending application of Richard H. Baker, U.S. Ser. No. 829,334, filed Aug. 31, 1977, for HIGH-POWER SWITCHING AMPLIFIER. Reference is made to FIG. 6 of this application, which figure is identical to the circuit shown in FIG. 2 of the present application, even as to reference designations. For purposes of this discussion, it should be noted that when a high level signal is applied to the input terminal 33 of this switching amplifier circuit, the Darlington switching network 37,39 is turned on for providing a relatively low impedance current conduction path between terminals 41 and 43. Alternatively, when a relatively low level input signal, such as 0 volt, is applied to the input terminal 33 of the switching amplifier circuit, the Darlington network 27,29 is turned on for providing a relatively low impedance current conduction path between terminals 45 and 41. It is also important to note that with this particular switching amplifier circuit of FIG. 2, as applied for use in the waveform synthesizer circuit of FIG. 1, the Darlington switches 27,29 and 37,39 cannot be turned on at the same time, for this would effectively short-circuit the battery 136 to ground, causing catastrophic failure of the Darlington switching device 27,29 and 37,39.

Figure 3:
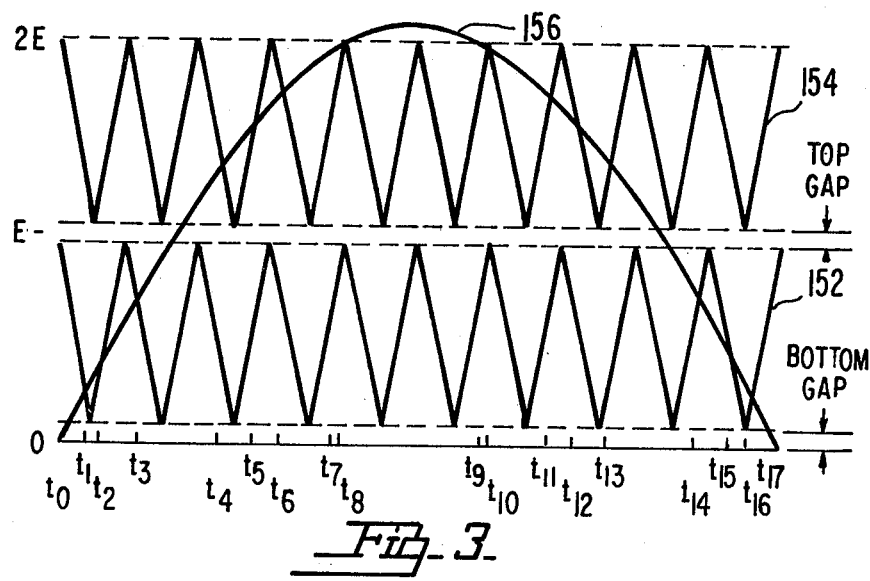
FIG. 3 shows the positive half-cycle of a sine wave reference signal and its intercepts with a pair of level shifted triangular timing waveforms.
Figure 4:
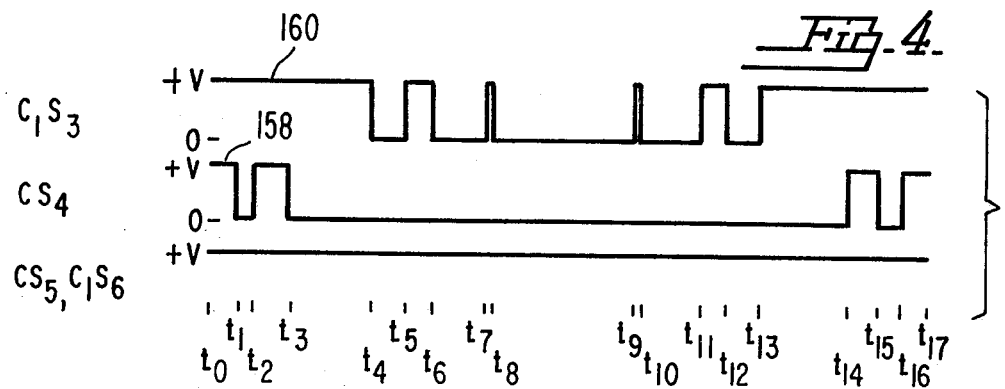
FIG. 4 shows the individual control signals derived from the comparison and decoding of the intercepts between the sine wave reference signal and triangular timing signals of FIG. 3.

In FIG. 3, for purposes of simplifying this discussion, two triangular waveforms 152,154 are used as timing or sampling waveforms for sampling a positive half-cycle of a sine wave reference signal 156. It should be noted that the sampling waveforms do not have to be in phase with the reference signal. If desired, more than two triangular sampling waveforms can be used for sampling the sine wave reference signal 156, the number of such triangular sampling waveforms being limited by the circuits of the waveform synthesizer and its controller. In this example, with reference to FIG. 4, the present method provides two pulse trains 158,160, the pulses of which represent the times that the amplitudes of the triangular waveforms 152,154 are greater in amplitude than the sine wave reference signal 156, respectively. The widths of the pulses represent the period of time between two successive intercepts of the associated triangular waveform and the sine wave reference signal 156 that the amplitude of the associated triangular waveform is greater than the reference waveform. Accordingly, between times $t_0$ and $t_1$ the amplitudes of the triangular waveforms 152,154 are each greater than that of the sine wave reference signal 156, causing a positive level of $+V$ for the pulse trains 158,160. For the period of time between $t_1$ and $t_2$ the amplitude of the sine wave reference signal 156 is greater than the amplitude of the triangular waveform 152, causing the pulse train 158 to have a 0 volt level for this time period. For the period of time between times $t_2$ and $t_3$ the amplitude of the triangular waveform 152 exceeds the amplitude of the sine wave reference signal 156, causing a $+V$ volt level for the plus train 158 during this time period, after which time period the amplitude of the sine wave reference signal 156 remains greater than the amplitude of the triangular waveform 152 until these waveforms intercept again at time $t_{14}$. As a result, the pulse train 158 has a 0 volt level between times $t_3$ and $t_{14}$. In this manner the pulse width modulated pulse trains 158 and 160 are formed for the positive half-cycle of the sine wave reference signal 156 occurring between times $t_0$ and $t_{17}$. The number of intercepts between the triangular timing waveforms 152,154 and the positive half-cycle of the sine wave reference signal 156 can be increased or decreased by adjusting the relative amplitudes and/or frequencies therebetween, the greater the number or intercepts between the triangular waveforms 152,154 and the reference waveform 156, the greater the number of pulses in the pulse trains 158,160 as would be known to one skilled in the art. The number of pulse trains so obtained is equal to the number of triangular waveforms used for sampling the reference waveform. In effect, the pulse trains 158,160 in combination contain a digitized representation of the pattern of the positive half-cycle of the sine wave reference signal 156.

The pulse train 158 can be directly applied as a control signal for turning on and off a solid-state switch, for example, for obtaining power amplification and an output waveform having a pattern that is the inversion of the pattern of the pulse train 158, this inverted pattern representing or having an rms voltage substantially equivalent to the rms voltage of the clipped waveform of the sine wave reference signal between times $t_0$ and $t_{17}$, the clipping level being at E volts. Similarly, the pulse train 160 can be applied to an inverting solid-state power switch for obtaining a synthesized output waveform having a pattern corresponding to the inversion of the pulse train 160, and an rms voltage substantially equal to the rms voltage of the portion of the positive half-cycle of the sine wave reference signal 156 between times $t_4$ and $t_{13}$. Accordingly, if such partial waveforms are combined, the combination provides an output waveform having an rms voltage substantially equivalent to the rms voltage of the positive half-cycle of the sine wave reference signal between times $t_0$ and $t_{17}$. Such a combination is obtained by decoding the pulse trains 158,160 into representative control signals for operating a particular waveform synthesizer circuit or inverter. In this example, the pulse trains 158,160 are decoded for providing the control signals $C_1S_3$, $CS_4$, $CS_5$, $C_1S_6$, for operating the switches S3 through S6 of the waveform synthesizer circuit of FIG. 1, for producing the two-tier notched waveform 162 (see FIG. 5)

equivalent of the positive half-cycle of the sine wave reference signal 156. If some other waveform synthesizer was to be operated via the digitized information of pulse trains 158,160, these pulse trains would most likely have to be decoded into some other set of control signals.

In FIG. 5 the positive half-cycle of a pure sine wave is shown in phantom with the synthesized waveform equivalent 162. The harmonic content of this synthesized waveform 162 is controlled by adjusting the positions and widths of the pulses and notches in the first and second tiers between 0 and +E volts and E and 2 E volts, respectively. With reference to FIG. 3, this adjustment is made by controlling the width of the top gap between the triangular sampling wavefroms 152,154. If the width of this gap is increased by raising the level of the triangular waveform 154, then the widths of the notches in the upper tier of the synthesized waveform 162 increases, along with a corresponding decrease in the widths of the pulses in this upper tier. If the width of this gap is increased by lowering the level of the triangular waveform 152, then the widths of the notches in the first tier between 0 and +E volts of synthesized waveform 162 are decreased, along with corresponding increases in the widths of the pulses in this first tier. Obviously, as the pulse widths of the first and second tiers are increased, the average rms value of the synthesized waveform 162 increases. The width of the top gap is adjusted to obtain minimum distortion or harmonic content of the synthesized waveform, while maintaining an adequate rms value for this waveform.

In certain applications, it may be desirable to delay the application of power to a load such as 144 in FIG. 1, for a period of time at the initiation of each half-cycle of the synthesized waveform. In other applications it may be desirable to apply power to a load prior to the initiation of the actual half-cycle of the synthesized waveform. In this example, by adjusting the bottom gap shown in FIG. 3 between the triangular waveform 152 and the 0 axis, the beginning of the first pulse of the first tier of the synthesized waveform 162 can be initiated earlier in the beginning of the half-cycle by decreasing the bottom gap, or later in the initiation of the half-cycle by increasing the gap. Also, this first pulse can be initiated prior to the 0 crossover of the sine wave reference signal 156 by having a negative value of bottom gap, that is, by lowering the level of the triangular waveform 152 to cause an interception between the triangular waveform 152 and the 0 axis. If the load 144 is an AC motor, for example, the width of the bottom gap is adjusted to match the slip-torque characteristics of the motor to the voltage-frequency characteristics of the waveform synthesizer circuit of FIG. 1, for preventing the application of power to the motor when the amplitude of the sine wave reference signal is approaching 0 volt in a frequency range approaching 0.

Figure 7:
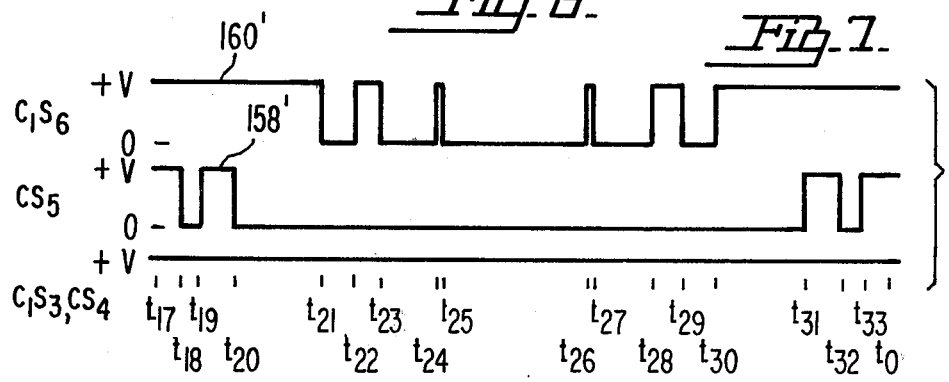
FIG. 7 shows the control signals resulting from the comparison and decoding of the intercepts between the sine wave reference signal and pair of triangular waveforms of FIG. 6.
Figure 8:
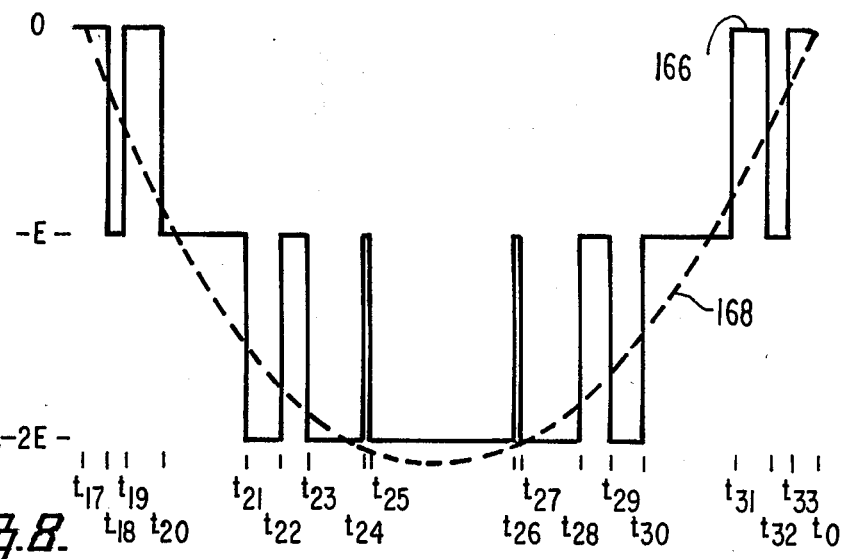
FIG. 8 shows the negative going portion of the multitiered step-like notched waveform equivalent of the sine wave reference signal produced by the waveform synthesizer circuit driven by the control signals of FIG. 7.

The negative half-cycle of the sine wave reference signal 156 is generated in a manner substantially identical to that described for generating the synthesized waveform 162 for the positive half-cycle. In this example, with reference to FIG. 6, the negative half-cycle of the sinusoidal reference waveform is inverted or only positive going half-cycles of a sine wave reference signal (full wave rectified) are produced, in either case obtaining a positive going half-cycle of a reference sine wave 156'. As shown, the triangular timing waveforms 152 and 154 are compared with the half-cycle of the sine wave reference signal 156' for producing the pulse trains 158',160' of FIG. 7. The pulse trains 158' and 160' are decoded for producing the control signals $C_1S_3$, $CS_4$, $CS_5$ and $C_1S_6$, for operating the switches $S_3$ through $S_6$ of the waveform synthesizer circuit of FIG. 1, for producing the synthesized negative half-cycle 166 of the sine wave reference signal 156 (see FIG. 8). The negative half-cycle of the pure sine wave being synthesized is shown in phantom as waveform 168 in FIG. 8. Note that the synthesized half-cycle of the sine wave reference signal 156,156' occurs over the time period between $t_{18}$ and $t_{33}$.

If the amplitude of the sine wave reference signal decreases to below +E volts, a single-tiered step-like synthesized waveform is obtained from the waveform synthesis circuit. In other words, as previously explained, the numbers of triangular waveforms intercepting the sine wave reference signal determine the number of tiers in the positive and negative half-cycle portions of the synthesized output waveform. The amplitude of the reference sine wave can be varied to obtain a particular notched pattern in the synthesized output waveform. Also, the amplitude of the synthesized sinusoidal output waveform can be held constant while varying the frequency of this waveform, by selectively varying the frequency of the reference sine wave while keeping the amplitude of this reference sine wave signal constant.

It is often times desirable in motor drive control applications to provide a constant volts per hertz ratio for the AC output signal used to drive the motor. In this example, a constant volts per hertz ratio of the synthesized AC output waveform 162,166 is obtained by simultaneously varying the amplitude and frequency of the reference sin wave signal. Alternatively, the frequency of the reference sine wave signal could be simultaneously varied along with the amplitude of the triangular waveforms used for timing or sampling.

Figure 9:
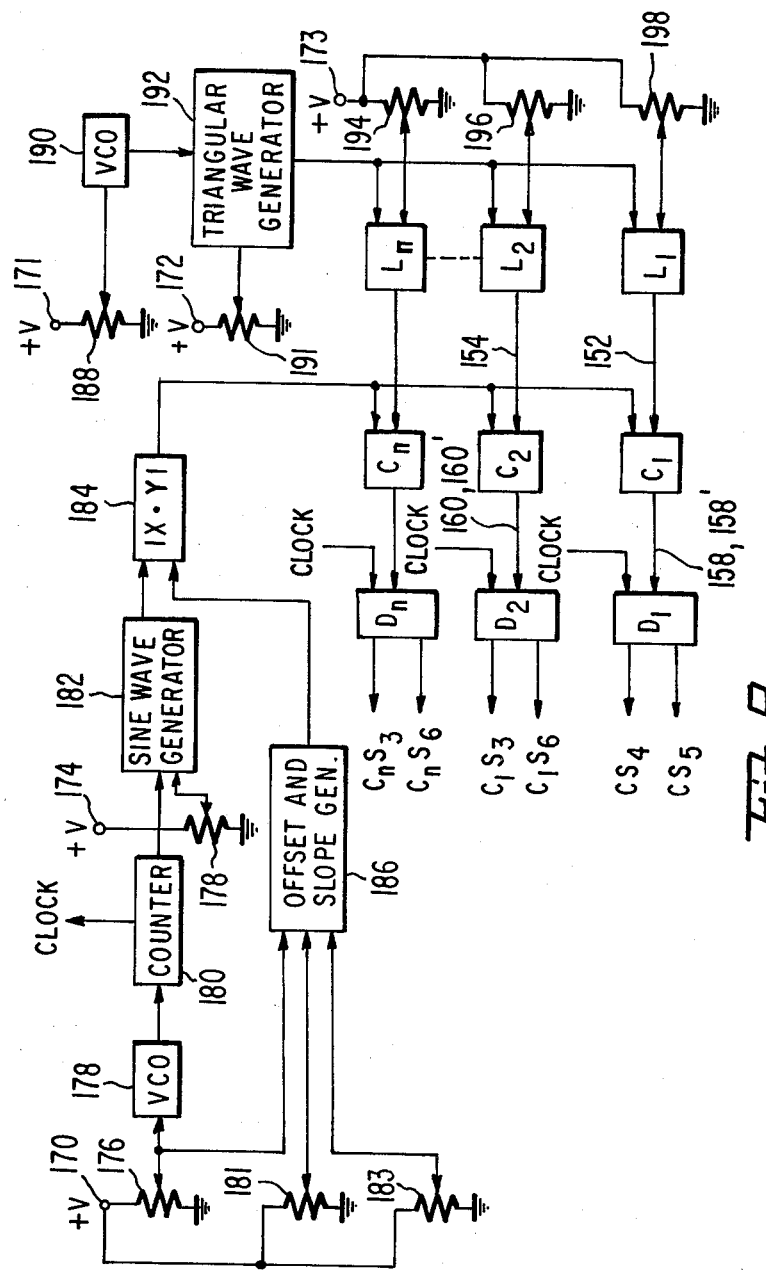
FIG. 9 is a block schematic diagram of a controller system for producing the control signals of FIGS. 4 and 7, for operating a particular waveform synthesizer system.
Figure 10:
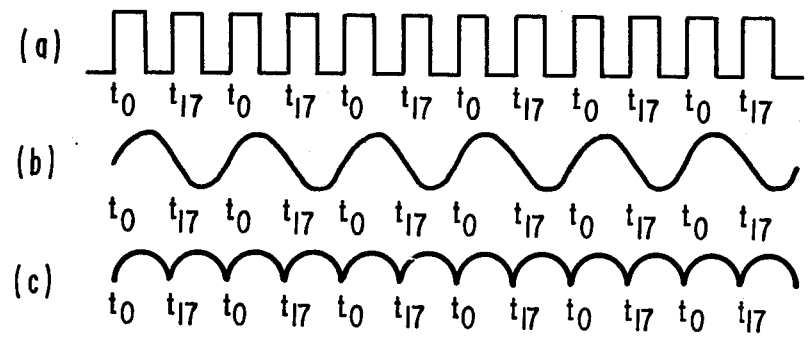
FIG. 10 is a timing diagram showing the clock signal (A), a sine wave reference signal (B) and an absolute value detected or full wave rectified waveform (C) of the sine wave reference signal (B)

In FIG. 9, a block-circuit schematic diagram of a controller for producing the control signals for operating the waveform synthesizer circuit of FIG. 1 for producing a multitiered step-like notched synthesized sine wave operates as follows: An operating voltage +V is applied to terminals 170 through 174. A variable resistor 176 is used to provide a selectively divided down portion of the operating voltage +V as a frequency setting input signal for the voltage controlled oscillator (VCO) 178, and as a frequency indicator input signal to the offset and slope generator 186. The output signal from the VCO is applied to a counter 180 which produces two output signals, one being a clock signal shown as waveform A in FIG. 10. This clock signal is used as a synchronizing and gating signal in various circuits of the controller, as will be described. The other output signal from counter 180 is a digital representation of a staircase waveform (not shown), and is applied as a time reference or a cycling input signal to a sine wave generator 182. The output signal from the sine wave generator 182 is synchronized with the clock signal, and, dependent upon the design of this generator 182, can be made to be either a true sinusoidal waveform as shown in B of FIG. 10, or only positive going half-cycles of a sine wave as shown in C of FIG. 10, in response to each cycle of the clock signal (A). To derive this equivalent full wave rectified sine wave shown as waveform (C) in FIG. 10, if the sine wave generator 182 is designed for producing the sinewave of FIG. (B) applied as an input signal to an absolute value multiplier 184, which automatically provides the equivalent of waveform FIG. 10

(C) multiplied by some DC level from an offset and slope generator 186. If the sinewave generator 182 is designed to produce the waveform of FIG. 10 (C), then the multiplier circuit 184 need not be an absolute value multiplier.

Figure 11:
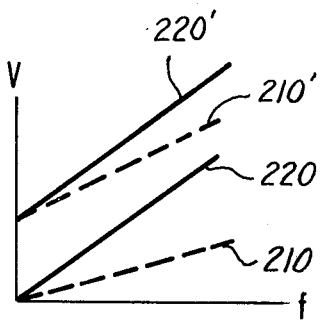
FIG. 11 shows a family of curves for the change in the rms value of the synthesized waveform versus frequency.

In certain applications for driving an AC motor, for example, it is desirable to provide a predetermined rms value for the synthesized AC output signal used to drive the motor at frequencies approaching 0. Also, as previously mentioned, it is desirable to provide some constant volts per hertz ratio for the synthesized waveform. In FIG. 11, a family of possible curves, each for providing a different volts per hertz ratio for the synthesized waveform are shown. Curves 210 and 220 each have 0 offset, with curve 220 having the greater slope, whereas curve 210' and 220' represent the curves 210 and 220 offset a predetermined amount, respectively, at 0 frequency. The basic amplitude of the sine wave output signal from sine wave generator 182 is set by adjusting the variable resistor 178, this resistor being connected between a terminal 174 for receiving the operating voltage +V and ground, as shown. Variable resistors 181 and 183 are adjusted for setting the offset and slope, respectively, for obtaining a desired voltage versus frequency curve for the synthesized output waveform. The DC voltages from the variable resistors 181 and 183 are applied to the offset and slope generator 186, which combines these DC levels into a DC output signal for application as an input signal to the multiplier 184. In turn, the multiplier 184 produces an output signal representing the product of the DC level from the offset and slope generator 186 and the output signal from the sine wave generator 182. This product signal is applied as an input signal to voltage comparators $C_1$, $C_2$, through $C_n$.

The triangular waveforms are produced in the following manner. A variable resistor 188 is adjusted for controlling the frequency of the output signal from a VCO 190. The output signal from the VCO 190 is applied to a triangular wave generator 192, the latter responding by producing the triangular waveform centered about 0 volt. The amplitude of the triangular waveform is controlled by adjusting the variable resistor 191, and the frequency of this waveform is adjusted by controlling the output frequency from the VCO 190. The triangular waveform generated by the generator 192 is applied as an input signal to each one of a plurality of level shifting circuits $L_1$, $L_2$ through $L_n$. The variable resistors 194, 196 and 198 are adjusted for individually controlling the degree of level shifting of the triangular wave via $L_1$ through $L_n$. The level shifted triangular waveforms from the level shifting circuits $L_1$ and $L_2$ are analogous to the triangular waveforms 152, 154, respectively, shown in FIGS. 3 and 6.

If in FIG. 1, the waveform synthesizer circuit uses n-cascaded stages of the level shifting circuits 137 and 137', respectively, then n level shifting circuits are required for the controller of FIG. 9, as indicated by the nth level shifting network $L_n$ in this latter figure (n is equal to the number of cascaded stages of the waveform synthesizer circuit). The triangular waveforms from the level shifting circuits $L_1$ through $L_n$ are applied as input signals to the comparator circuits $C_1$ through $C_n$, respectively. As previously described, these comparator circuits are each used for comparing the sine wave reference signal (in this case the product signal from the multiplier 184) with their respective triangular waveform for producing an output signal that is a pulse width modulated pulse train representing successive intercepts between the product signal and the associated triangular waveform. The pulse trains from the output terminals of the comparators $C_1$ through $C_n$ are applied as individual input signals to the decoder networks $D_1$, $D_2$ through $D_n$, respectively. The clock signal is applied as the second input signal to each one of the decoding networks $D_1$ through $D_n$. These decoding networks are designed for decoding the pulse trains into appropriate control signals for operating a particular waveform synthesizer inverter circuit. In this example, the decoding network $D_1$ provides the control signals $CS_4$ and $CS_5$, decoder $D_2$ provides control signals $C_1S_3$ and $C_1S_6$, the decoding network $D_n$ providing the control signals $C_nS_3$ and $C_nS_6$. In this example, it is assumed that for the waveform synthesizer circuit of FIG. 1 that n is equal to 1, therefore the stages 137 and 137' are not being cascaded. Accordingly, only four control signals are required, $CS_4$ for operating switch $S_4$, $CS_5$ for operating switch $S_5$, $C_1S_3$ for operating switch $S_3$, and $C_1S_6$ for operating switch $S_6$, as previously described. If the level shifting stages 137 and 137' are cascaded N times, then cascaded (N−1) additional $C_nS_3$ control signals will be needed for operating each one of the switches $S_3$ of the cascaded stages 137, and similarly (N−1) additional $C_nS_6$ control signals will be needed for operating the switches $S_6$ of each one of the cascaded stages 137'.

Figure 12:
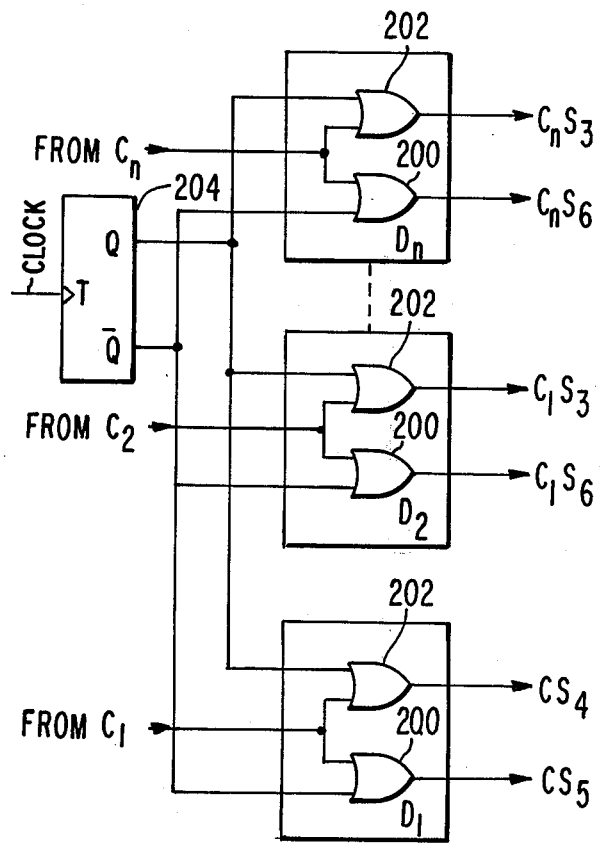
FIG. 12 is a logic network of typical decoder stages for use with the present invention, for example.

In FIG. 12, a logic network is shown for providing the decoding functions of the decoders $D_1$ through $D_n$. As shown, a single toggle type flip-flop is used for providing gating signals to each one of the decoding networks $D_1$ through $D_n$, each of which includes a pair of OR gates 200, 202. The flip-flop 204 divides the clock signal by a factor of 2, and provides its Q output signal as a common input signal to each one of the OR gates 202, and its $\overline{Q}$ output signal as a common individual input signal to each one of the OR gates 200. The other input signal to each one of the OR gates 200, 202 of the decoders $D_1$–$D_n$ are the pulse trains from the comparators $C_1$–$C_n$, respectively. Accordingly, whenever the Q output signal from flip-flop 204 is high (at a level corresponding to +V) the output signals $CS_4$, $C_1S_3$ through $C_nS_3$ are each high, and whenever the Q output signal is low, these control signals correspond to the pulse train from the comparator $C_1$–$C_n$, respectively, associated with their respective decoding network $D_1$–$D_n$. Similarly, whenever the $\overline{Q}$ output signal from flip-flop 204 is high, control signals $CS_5$, $C_1S_6$ through $C_nS_6$ are each high, and when $\overline{Q}$ is low (at ground or 0 volt) these signals correspond to the pulse train of one of the comparators $C_1$–$C_n$ associated with their respective decoding network $D_1$–$D_n$ respectively. Circuits for providing the VCO's 178, 190, counter 180, sine wave generator 182, offset and slope generator 186, multiplier 184, triangular wave generator 192, level shifting networks $L_1$–$L_n$, and comparators $C_1$–$C_n$ are known to those skilled in the art, therefore an example for these latter circuits is not illustrated herein.

In summation, the following points should be noted. The reference waveform can be other than a sine wave for generating a synthesized waveform thereof. The reference waveform can be any signal having substantial area, that is, any practical waveform known to one skilled in the art. The peak amplitude of the synthesized output waveform is dependent upon the level of the DC supply applied as an operating voltage to the particular waveform synthesizer circuit or inverter operated by the controller, and the rms or average value of the synthesized output waveform is dependent upon both the peak amplitude of this waveform as well as its notching and pulse pattern. Also, the use of a triangular waveform as the timing or sampling waveform for a PWM system is preferred because of the continuously varying amplitude and symmetry of such a waveform. If a step waveform is used as the timing waveform, undesirable harmonic effects may occur, but in certain applications the timing waveform could be a sawtooth, ramp, or a sinewave, for example.

In this example, only a single phase synthesized AC waveform has been discussed. Plural phase synthesized waveforms can be developed in a similar manner by duplicating the present system a number of times equal to the number of phases required, and incorporating necessary circuitry for phase displacing the synthesized waveforms each an appropriate number of degrees for obtaining multiphase interrelation between the signals. Alternatively, the synthesized waveform developed by the present system can be applied to a number of delay means such as shift registers, one per each additional phase desired, each shift register being controlled for delaying the basic synthesized waveform a required period of time, for obtaining multiphase related synthesized waveforms from the output signals of each one of the shift registers. This latter technique of delaying a given signal a plurality of times for developing multiphase related signals is known in the art.

What is claimed is:

1. A method for inverting a DC voltage into a multitiered step-like notched waveform equivalent of a predetermined AC waveform, comprising the steps of:
   producing a reference AC waveform having a pattern corresponding to that of said predetermined AC waveform;
   producing a plurality of AC sampling waveforms, level shifted from one another, and each having a frequency substantially greater than that of said reference AC waveform;
   comparing each one of said plurality of sampling waveforms with each positive and negative half-cycle of said reference waveform for producing first and second sets of pulse width modulated pulse trains, respectively, the pulse widths of the pulses of each one of said pulse trains corresponding to the period of time that the amplitude of its associated sampling waveform exceeds the absolute amplitude of said reference waveform between two successive intercepts thereof, the number of pulse trains in each one of said first and second sets of pulse trains being equal to the number of said plurality of sampling AC waveforms; and
   applying said first and second sets of pulse trains to an inverter circuit, for operating the inverter circuit to produce said multitiered step-like notched waveform, the number of tiers of each half-cycle of which are substantially equal to the number of said plurality of sampling AC waveforms.

2. In a converter system including a waveform synthesizer circuit including a plurality of switching circuit means each responsive to individual control signals, for in combination operating to invert a DC voltage into a multitiered step-like notched output waveform substantially equivalent to a desired AC waveform, a method for producing said control signals comprising the steps of:
   producing a reference AC waveform having a pattern corresponding to that of desired waveform;
   producing a plurality of AC timing waveforms, level shifted from one another, and each having a frequency substantially greater than that of said reference AC waveform;
   inverting the negative going portions of said reference AC waveform;
   comparing said plurality of AC timing waveforms with the positive going and inverted negative going portions of said reference AC waveform, for producing a plurality of pulse trains equal in number to said plurality of AC timing waveforms, each one of said pluse trains being associated with an individual one of said timing waveforms, the pulse widths of the individual pulses of each one of said pulse trains corresponding to the time period between given successive intercepts of its associated timing waveform and the reference waveform; and
   decoding said plurality of pulse trains for producing the control signals for operating said plurality of switching circuit means.

3. The method of claim 2, wherein the step of producing said plurality of AC timing waveforms, includes the steps of:
   producing an individual AC timing waveform; and
   level shifting said individual AC timing waveform n times, where n is equal to the desired number of said plurality of AC timing waveforms.

4. The method of claim 2, further including the step of selectively varying the amplitude of said reference AC waveform for providing a predetermined notching pattern for said output waveform.

5. The method of claim 2, further including the step of selectively varying the frequency of said reference AC waveform while keeping its amplitude constant, for obtaining a desired frequency of said output waveform, while maintaining its amplitude constant.

6. The method of claim 2, further including the step of simultaneously varying the amplitude and frequency of said reference AC waveform, for operating said plurality of switching circuit means to produce a notch pattern in said output waveform providing a constant volts per hertz ratio thereof.

7. The method of claim 2, further including the step of simultaneously varying the frequency of said reference AC waveform and amplitude of said plurality of AC timing waveforms, for operating said plurality of switching circuit means to produce a notch pattern in said output waveform providing a constant volts per hertz ratio thereof.

8. The method of claim 2, wherein the step of producing a plurality of AC timing waveforms includes producing a plurality of triangular waveforms.

9. A method for producing individual control signals for operating a plurality of individual switching circuits of an inverter system, for converting a DC voltage into an AC output waveform that is multitiered in a step-like manner with substantially each tier being notched, and is substantially equivalent to a reference AC waveform, comprising the steps of:
   producing said reference AC waveform;
   selectively offsetting the amplitude of said reference AC waveform for ensuring a notched pattern of said output waveform providing a minimum rms voltage thereof as the frequency approaches zero;
   selectively increasing the amplitude of said reference AC waveform with increasing frequency thereof, in such manner to linearly increase at a desired slope the rms voltage of said AC output waveform with increasing frequency, for maintaining a constant volts per hertz ratio of said AC output voltage waveform;

producing a triangular waveform having a frequency substantially greater than that of said reference AC waveform;

level shifting said triangular waveform n times, for providing n triangular waveforms each having a different range of amplitudes, n also being the maximum number of tiers for said output waveform;

comparing each one of said n triangular waveforms with each half-cycle of said offset and slope adjusted reference AC waveform, for producing up to n pulse trains, the pulse widths of the pulses of each one of said pulse trains being equal to the periods of time that its associated triangular waveform has an amplitude exceeding the absolute amplitude of said reference AC waveform; and decoding said n pulse trains for producing said individual control signals.

10. The method of claim 9, wherein said steps of offsetting and slope adjusting said reference AC waveform, includes the steps of:

producing a first DC voltage having a value equivalent to the desired amount of offset;

producing a second DC voltage having a value equivalent to the desired amount of slope;

combining said first and second DC voltages for producing a third DC voltage; and multiplying said reference AC waveform with said third DC voltage, for producing said offset and slope adjusted reference AC waveform.

11. In a waveform synthesizer circuit including a plurality of switching circuit means each responsive to an individual control signal, for in combination operating to invert a DC voltage into a multitiered steplike notched output waveform substantially equivalent to a desired AC waveform, a controller for producing said control signals, comprising:

first generator means for producing a reference AC waveform having a pattern corresponding to that of said desired waveform;

second generator means for producing a plurality of AC timing signals, level shifted from one another, and each having a frequency substantially greater than that of said reference AC waveform; and comparator means for comparing the waveform for each half-cycle of said reference AC waveform with each one of said plurality of AC timing signals, for producing a plurality of pulse trains, each one of said pulse trains being associated with an individual one of said timing signals, the pulse widths of the individual pulses of each one of said pulse trains corresponding to the time period between given successive intercepts of its associated timing signal and the reference AC waveform, during which time the former is greater in amplitude than the latter; and decoding means receiving said plurality of pulse trains as individual input signals, for decoding said pulse trains to produce said individual control signals for operating said plurality of switching circuit means of said waveform synthesizer circuit.

12. The controller of claim 11, wherein said second generator means includes:

means for producing an individual AC timing signal; and means receptive of said individual AC timing signal, for level shifting this AC timing signal n times, where n is equal to the desired number of said plurality of AC timing signals produced as output signals of said level shifting means.

13. The controller of claim 12, wherein said means for producing an individual AC timing signal includes:

voltage controlled oscillator means responsive to a first DC control voltage, for producing an output signal having a frequency proportional to the level of said DC control voltage; and triangular waveform generator means responsive to the output signal of said voltage controlled oscillator means and a second DC control voltage, for producing a triangular wave output signal as said timing signal, having a frequency directly proportional to that of the output signal of said voltage controlled oscillator means, and a peak amplitude directly proportional to the level of said second DC control voltage.

14. The controller of claim 12, wherein said level shifting means includes:

a plurality of n DC voltage sources, each selectively variable for producing a desired level of DC output voltage;

a plurality of n level shifting circuits each responsive to said individual AC timing signal and an individual one of said DC output voltages from said n DC voltage sources, for producing an individual one of said plurality of AC timing signals level shifted in direct proportion to the level of its respective DC output voltage.

15. The controller of claim 11, wherein said first generator means further includes:

means for selectively controlling the amplitude of said reference AC waveform; and means for selectively controlling the frequency of said reference AC waveform;

said amplitude control means and frequency control means permitting either (1) the frequency of said reference AC waveform to be held constant, while selectively varying the amplitude of said reference waveform to obtain a predetermined notching pattern for a given rms value of said output waveform, or (2) selectively varying the frequency of said reference AC waveform while keeping its amplitude constant, for obtaining a desired frequency of said output waveform, while maintaining its rms amplitude constant, or (3) simultaneously varying the amplitude and frequency of said reference AC waveform, for producing a notch pattern in said output waveform providing a desired voltage-frequency profile.

16. A controller for producing individual control signals for operating each one of a plurality of individual switching circuits of an inverter system, for converting a DC voltage into an AC output waveform that is a step-like multitiered notched waveform having n tiers, and equivalent to the pattern of a reference waveform, said controller comprising:

means for producing said reference AC waveform;

means for selectively offsetting the amplitude of said reference AC waveform for ensuring a notched pattern of said output waveform which provides a minimum rms voltage thereof as its frequency approaches zero;

means for selectively increasing the amplitude of said reference AC waveform with increasing frequency thereof, in such manner to linearly increase at a desired slope the rms voltage of said AC output waveform with increasing frequency, for maintaining a notch pattern for a particular voltage versus frequency profile of said AC output waveform;

means for producing a triangular timing waveform having a frequency substantially greater than that of said reference AC waveform;

means receptive of said triangular timing waveform, for producing a plurality of n level shifted representations of said triangular timing waveform, each one of said level shifted triangular waveforms each having a different range of amplitudes;

comparator means for comparing each one of said n level shifted triangular waveforms with each half-cycle of said offset and slope adjusted reference AC waveform, for producing up to n pulse trains, the pulse widths of the pulses of each one of said pulse trains being equal to the periods of time that its associated triangular waveform has an amplitude exceeding the absolute amplitude of said reference AC waveform between two successive intercepts thereof; and logic means receiving said n pulse trains as individual input signals, for decoding the pulse trains into said individual control signals.

17. The controller of claim 16, wherein said offsetting means and slope adjusting means, include:

means for selectively providing a first DC voltage having a level equivalent to the desired amount of offset;

means for selectively producing a second DC voltage having a value equivalent to the desired amount of slope;

means for combining said first and second DC voltages for producing a third DC voltage; and multiplier means receptive of said reference AC waveform and third DC voltage, for producing as the product thereof said offset and slope adjusted reference AC waveform.

18. A circuit for producing a plurality of pulse width modulated control signals, the combination of which are pulsed representations of the pattern of a reference waveform, comprising:

means for generating said reference waveform;

means for generating a plurality of timing waveforms, level shifted from one another, and each having a frequency substantially greater than that of said reference waveform; and comparator means receiving said reference waveform and timing waveforms as individual input signals, for comparing each half-cycle of said reference waveform with each one of said timing waveforms, for producing said plurality of control signals each as a pulse train, the widths of the pulses of each pulse train corresponding to the periods of time that the amplitude of its associated timing waveform exceeds the absolute amplitude of said reference waveform between two successive intercepts thereof.

19. The circuit of claim 18, wherein said means for generating said reference waveform includes a sine wave generator.

20. The circuit of claim 18, wherein said means for generating a plurality of timing waveforms includes:

means for producing an individual timing waveform having a frequency substantially greater than that of said reference waveform; and a plurality of level shifting circuit means, each one of which receives said individual timing waveform as an input signal, for level shifting said timing waveform to different levels, the output signals from each one of said level shifting circuit means being said plurality of timing waveforms.

21. The circuit of claim 20, wherein said means for producing an individual timing waveform includes a triangular waveform generator.

22. A method for producing a plurality of pulse width modulated control signals, the combination of which are pulsed representations of the pattern of a reference waveform, comprising the steps of:

generating said reference waveform;

generating a plurality of timing waveforms, level shifted from one another, and each having a frequency substantially greater than that of said reference waveform; and comparing each half-cycle of said reference waveform with each one of said timing waveforms, for producing said plurality of control signals each as a pulse train, the widths of the pulses of each pulse train corresponding to the periods of time that the amplitude of its associated timing waveform exceeds the absolute amplitude of said reference waveform between two successive intercepts thereof.

* * * * *